United States Patent
Szabó et al.

(10) Patent No.: US 12,109,707 B2
(45) Date of Patent: Oct. 8, 2024

(54) CONTROL OF ROBOTIC DEVICES OVER A WIRELESS NETWORK

(71) Applicant: Telefonaktiebolaget LM Ericsson (PUBL), Stockholm (SE)

(72) Inventors: Géza Szabó, Kecskemét (HU); Sándor Rácz, Cegléd (HU); Norbert Reider, Tényö (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 395 days.

(21) Appl. No.: 17/769,147

(22) PCT Filed: Oct. 16, 2019

(86) PCT No.: PCT/EP2019/078082
§ 371 (c)(1),
(2) Date: Apr. 14, 2022

(87) PCT Pub. No.: WO2021/073732
PCT Pub. Date: Apr. 22, 2021

(65) Prior Publication Data
US 2023/0135285 A1    May 4, 2023

(51) Int. Cl.
*B25J 9/16* (2006.01)
*B25J 13/00* (2006.01)

(52) U.S. Cl.
CPC .......... *B25J 9/1664* (2013.01); *B25J 9/1607* (2013.01); *B25J 9/1689* (2013.01); *B25J 13/006* (2013.01); *G05B 2219/40174* (2013.01)

(58) Field of Classification Search
CPC ...... B25J 9/1664; B25J 9/1607; B25J 9/1689; B25J 13/006; G05B 2219/40174; G05B 2219/39062; G05B 2219/40304
See application file for complete search history.

(56) References Cited

U.S. PATENT DOCUMENTS

| 9,623,562 | B1 * | 4/2017 | Watts | B25J 13/006 |
| 2014/0012415 | A1 * | 1/2014 | Benaim | G05B 19/4061 700/255 |

(Continued)

OTHER PUBLICATIONS

Dev Sreevijayan et al., Architectures for Fault-Tolerant Mechanical Systems, Department of Mechanical Engineering, University of Texas at Austin—Dec. 4, 1994.

(Continued)

*Primary Examiner* — Sohana Tanju Khayer
(74) *Attorney, Agent, or Firm* — Baker Botts L.L.P.

(57) ABSTRACT

The invention relates to a method for controlling a robotic device (50) with modified control commands transmitted over a wireless network, wherein the robotic device (50) comprises a plurality of joints (53), wherein each joint represents one degree of freedom of the robotic device, the method comprising at a trajectory modification entity (100): —determining a load of the wireless network (30), —receiving a plurality of control commands controlling a planned trajectory of the robotic device (50) from a robotic control entity (70), each of the control commands configured to control one degree of freedom of a first number of degrees of freedom addressed by the plurality of control commands, —determining a reduced number of degrees of freedom for the modified control commands smaller than the first number based on the determined load, —determining the modified control commands based on the reduced number of degrees of freedom, wherein the modified control commands address a limited number of degrees of freedom not higher than the reduced number of degrees of freedom, —transmitting the modified control commands instead of the received plurality of control commands to the robotic device (50).

20 Claims, 4 Drawing Sheets

(56) References Cited

U.S. PATENT DOCUMENTS

| | | | | |
|---|---|---|---|---|
| 2015/0032258 A1* | 1/2015 | Passot | ............... | G05D 1/0016 |
| | | | | 700/250 |
| 2015/0283702 A1* | 10/2015 | Izhikevich | ............ | B25J 9/163 |
| | | | | 700/257 |
| 2016/0297429 A1* | 10/2016 | Watts | ................ | B60K 31/00 |
| 2017/0182664 A1* | 6/2017 | Watts | ................ | B25J 9/1689 |
| 2017/0248966 A1* | 8/2017 | Lutz | .................. | B25J 9/1697 |
| 2018/0329425 A1* | 11/2018 | Watts | ............... | G05D 1/0297 |
| 2022/0026911 A1* | 1/2022 | Sinyavskiy | ......... | G05D 16/02 |

OTHER PUBLICATIONS

Jeroen De Maeyer et al., Cartesian Path Planning for Arc Welding Robots: Evaluation of the Descartes Algorithm, Department of Mechanical Engineering, Technology Campus Diepenbeek, Belgium—2017.

Emeka Eyisi et al., Passivity-Based Trajectory Tracking Control with Adaptive Sampling Over a Wireless Network, IEEE—2012.

Geza Szabo et al., Quality of Control-aware Resource Allocation in 5G Wireless Access Networks, European Union—2018.

Masmoudi Mostefa et al., Safe and efficient mobile robot teleoperation via a network with communication delay, Published Online—Jan. 12, 2017.

PCT International Search Report issued for International application No. PCT/EP2019/078082—Jul. 20, 2020.

PCT Written Opinion of the International Searching Authority issued for International application No. PCT/SE2019/078082—Jul. 20, 2020.

* cited by examiner

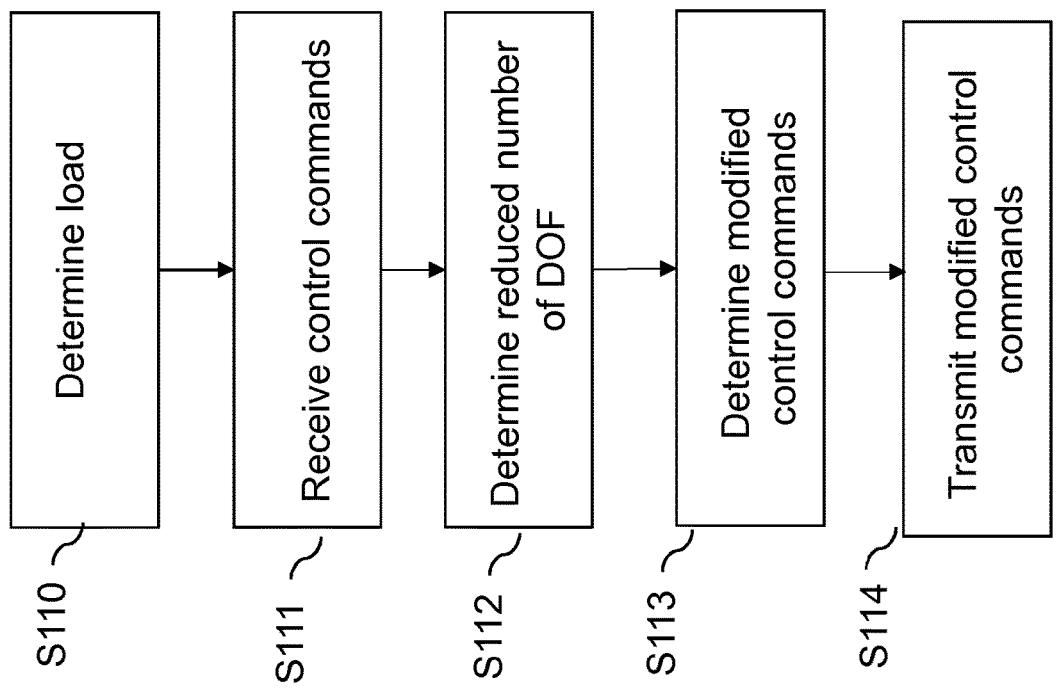

CONTROL OF ROBOTIC DEVICES OVER A WIRELESS NETWORK

PRIORITY

This nonprovisional application is a U.S. National Stage Filing under 35 U.S.C. § 371 of International Patent Application Serial No. PCT/EP2019/078082 filed Oct. 16, 2019 and entitled "Control Of Robotic Devices Over A Wireless Network" which is hereby incorporated by reference in its entirety.

TECHNICAL FIELD

The present application relates to a method for controlling a robotic device over a wireless network by a trajectory modification entity and relates to the corresponding trajectory modification entity. Furthermore, a computer program and a carrier comprising the computer program are provided.

BACKGROUND 5G networks are designed to handle the requirements of industrial applications, the use cases and the industrial protocols currently in use will still provide a challenge for wireless equipment designers and operators to cope with.

In wireless transport there are always resource limitations, e.g., wireless spectrum and reasonable resource allocation are always valid issues to tackle. One question addressed in this context is whether it is the only way to operate a remote control of a robot cell successfully via wireless by providing the required network characteristics in 24/7 or is it possible to relax the requirements in some operating phases of the system, thus introducing some level of QoE-awareness in industrial applications like in consumer mobile broadband?

In the past few years, there has been an increasing demand from customers towards the manufacturing industry to provide more and more customized products. Personalized production is one of the key motivations for manufacturers to start leveraging new technologies that enable to increase, for instance, the flexibility of production lines. High flexibility in general is needed to realize cost effective and customized production by supporting fast reconfiguration of production lines, as well as easy application development.

Manifold requirements are needed to be fulfilled technologically:
  low energy consuming actuators;
  battery capable operation of actuators;
  some embedded intelligence in the local controller;
  fast wireless connection for closed loop control;
  capable of any kind of IoT and Real Time Communication.

If a completely self-contained robot module is needed, it should be also self-propelled by internal battery and remotely controlled via wireless access.

The advances in battery technologies can provide the first, while the upcoming 5G supports the latter. Application of such a wireless technology in manufacturing enables, for instance, reducing cabling in a factory. Cableless communication is a real enabler of many applications that are difficult to achieve with production systems depending on wired connections e.g., jet engine manufacturing during the milling of the blades.

One can argue that it is difficult to fulfill the same requirements by modular robotics that are provided by industrial grade arms. The industrial robot has many metrics and measurable characteristics, which will have a direct impact on the robustness of the robot during the execution of its tasks. The main measurable characteristics are repeatability and accuracy. In a nutshell, the repeatability of a robot might be defined as its ability to achieve repetition of the same task. Accuracy is the difference (i.e. the error) between the requested task and the realized task (i.e. the task actually achieved by the robot). Practically, repeatability is doing the same task over and over again, while accuracy is hitting a target each time.

One objective is to have a robot that can repeat its actions while hitting the target every time. When the current mass production assembly lines are designed, robots are deployed to repeat a limited set of tasks as accurately and the fastest possible to maximize the productivity and minimize the number of faulty parts. The reprogramming of the robots rarely occurs e.g., on a weekly or monthly basis and it takes a long time e.g., days. Furthermore, it is a difficult task requiring lot of expertise.

There are numerous approaches in the industry aiming to optimize the operation of a robot cell. The purpose of such optimization is to minimize or maximize at least one of the following objective functions: 1) minimizing the execution time, respectively maximizing the robot productivity, considering that the relative speeds of the actuator's elements are limited constructively; 2) minimizing the energy consumption or mechanical work necessary for execution, leading to a reduction of the mechanical stresses in actuators and on the robot structure and obtaining smooth trajectories, easy to follow; 3) minimizing the maximum power required for operating the robot; 4) minimizing the maximum actuation forces and moments. The most common optimization criteria used are: minimum time trajectory planning; minimum energy trajectory planning or minimum actuation effort and minimum jerk trajectory planning. The remote control of a robotic cell via wireless is a new type of challenge that the above optimization strategies miss yet. There are various optimization strategies on the trajectory planning. E.g., energy efficient trajectory planning.

There is a significant networking aspect of the robot modules. While the industrial robot arm can be addressed as one entity i.e., the controller send out velocity commands containing a vector of six components for all the joints, the modular robots has to be addressed one-by-one. This issue arises for the status messages as well. While the industrial arm sends out one status packet in every 8 ms containing the positions, force, current, etc. of all the joints, the modules send the same info one-by-one.

Accordingly, a need exists to be able to effectively control a modular robotic device over a wireless network.

This need is met by the features of the independent claims. Further aspects are described in the dependent claims.

According to a first aspect a method for controlling a robotic device with modified control commands is provided which are transmitted over a wireless network, wherein the robotic device comprises a plurality of joints and wherein each joint represents one degree of freedom of a first number of degrees of freedom of the robotic device. The trajectory modification entity determines a load of the wireless network and receives a plurality of control commands controlling a planned trajectory of the robotic device from a robotic control entity. Each of the control commands is configured to control one degree of freedom of the first number of degrees of freedom. Furthermore, a reduced number of degrees of freedom is determined for the modified control commands, wherein this reduced number is smaller than the first number and the reduced number is determined based on the load of the wireless network. Additionally, the modified control commands are determined based on the reduced number of degrees of freedom, and the modified control commands address a limited number of degrees of freedom not higher than the reduced number of degrees of freedom. The modified control commands are then transmitted to the robotic device instead of the plurality of control commands.

Furthermore, the corresponding trajectory modification entity is provided comprising a memory and at least one processing unit, wherein the memory comprises instructions executable by the at least one processing unit. The trajectory modification entity is operative to function as discussed above or as discussed in further detail below.

As an alternative a trajectory modification entity is provided configured to control the robotic device with modified control commands transmitted over the wireless network. The trajectory modification entity comprises a first module configured to determine a load of the wireless network. A second module of the trajectory modification entity is configured to receive a plurality of control commands controlling a planned trajectory of the robotic device. In these control commands each of the control commands is configured to control one degree of freedom of the degrees of freedom of the robotic device. A third module is configured to determine a reduced number of degrees of freedom for the modified control commands smaller than the first number based on the determined network load. The trajectory modification entity comprises a fourth module configured to determine the modified control commands based on the reduced number of degrees of freedom. Here the modified control commands address the limited number of degrees of freedom not higher than the reduced number of degrees of freedom. A fifth module of the trajectory modification entity is configured to transmit the modified control commands to the robotic device.

With the proposed method and entity the plurality of control commands are modified such that radio resources are saved and that the control commands can be transmitted over the wireless network in view of the available resources provided by the wireless network.

Additionally, a computer program comprising program code is provided, wherein execution of the program code causes at least one processing unit to execute a method as discussed above or as discussed in further detail below.

Moreover, a carrier comprising the computer program is provided, wherein the carrier is one of an electronic signal, optical signal, radio signal, or a computer-readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments, unless explicitly mentioned otherwise.

BRIEF DESCRIPTION OF THE DRAWINGS

Other features and advantages will become apparent to one with skill in the art upon examination of the following detailed description and figures.

FIG. 3 shows a further example flowchart of a method carried out by the trajectory modification entity shown in FIG. 1 to control the robotic device.

DETAILED DESCRIPTION

Figure 1:
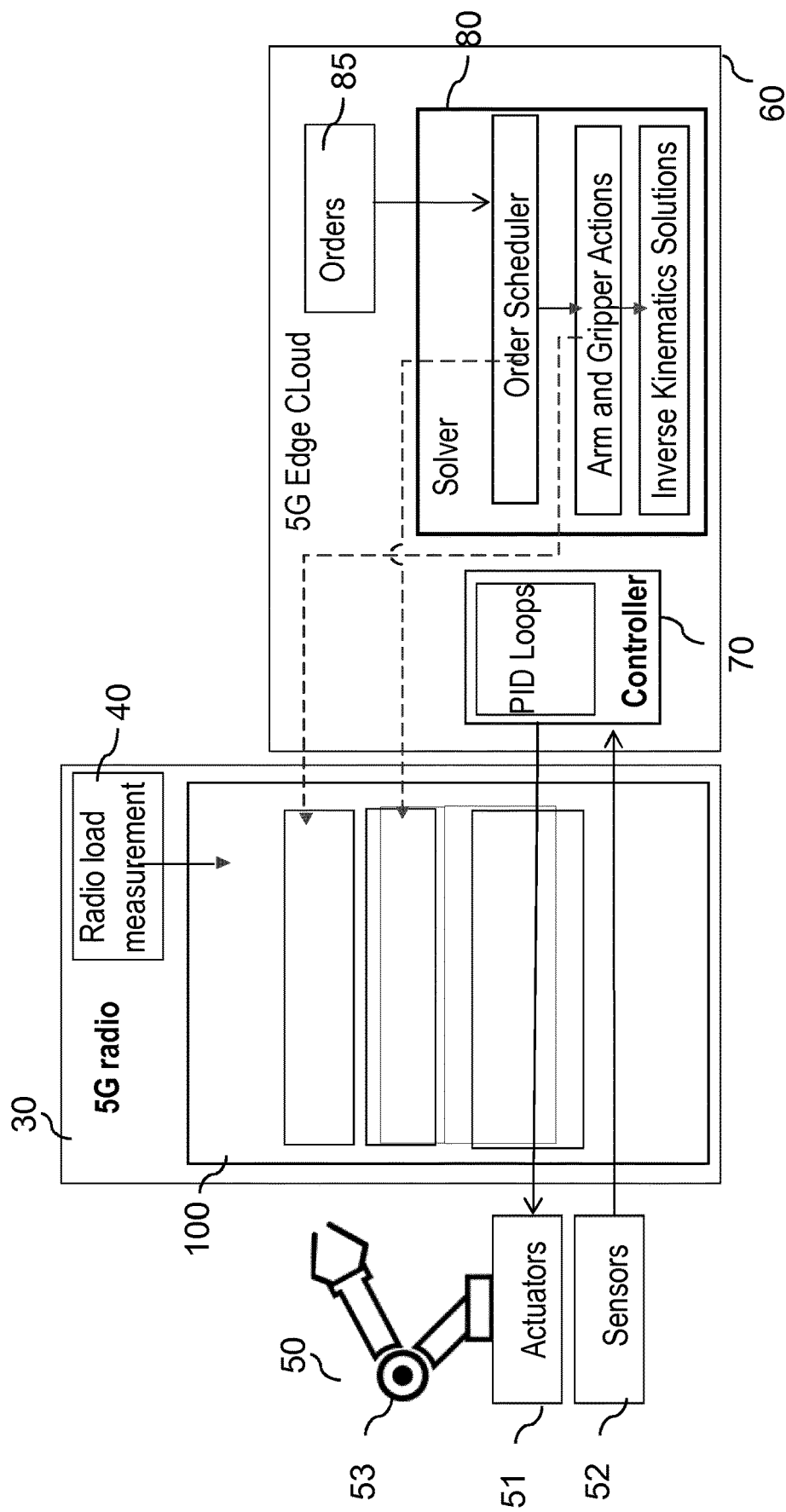
FIG. 1 shows a schematic architectural view of a system including a trajectory modification entity configured to modify control commands transmitted to a robotic device over a wireless network.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between the components may be established over a wired or wireless connection. Functional blocks shown in the figures may be implemented in hardware, software, firmware, or a combination thereof.

As will be explained below, a node or entity provided in the path between a robotic device and a robotic control entity is provided which can modify the transmitted control commands to save radio resources. This node analyzes the messages or commands sent to the group of joints of the robotic device and modifies the control commands to modified control commands to control only certain joints while keeping the error in the planned trajectory and the actually executed trajectory of the robotic device low.

FIG. 1 shows an architectural view of a system in which a robotic device 50 comprising a first number of joints 53 each having one degree of freedom is controlled over a wireless network 30. The robotic device 50 comprises a plurality of actuators/servos in order to control each of the joints 53. Furthermore, a plurality of sensors 52 are provided configured to determine the velocity and/or the position of the different links of the robotic device linked by the different joints 53. In the embodiment shown orders for controlling the movement of the robotic device 50 are generated by an entity 85, and based on these orders a solving entity 80 schedules the orders and translates the orders into actions to be carried out by the different elements such as arms or grippers of the robotic device. This entity 80 uses methods as known in the art to generate actions to be carried out by the robotic device 50. Entity 80 calculates the trajectories for the different components of the robotic device independent of any radio resources. A robotic control entity 70 then finally calculates the control commands for the planned trajectory of the robotic device which are transmitted to the robotic device via a cellular network 30, which in the embodiment shown is implemented as a 5G network. However, any other wireless or cellular network may be used, e. g. a 4G network. Furthermore, an entity 40 is provided configured to determine the load of the radio resources in the radio network part of the radio network. The load may be determined by e.g. checking the packet queues on the radio schedulers or by simply checking the number of parallel flows or radio bearers and comparing it with a known maximum. Each actuator can be connected to a mobile entity or user equipment, UE, with which the communication over the wireless network 30 is possible. The UE may be equipped with a Subscriber Identity such as a SIM.

In the radio network part 30 a trajectory modification entity 100 is provided which receives the control commands as generated by the robotic control entity 70 and which, based on the radio load, modifies the control commands in order to meet the radio resource limitations.

The trajectory modification entity is configured to determine the available radio resources that may be consumed by the control of the robotic device over the wireless network. Furthermore, the entity 100 is configured to set the cumulated goal tolerance. As the trajectory of the components of the robotic device linked by the joints will not correspond to the planned trajectory as planned by the control entity 70, entity 100 can take into account a certain maximum error or tolerance that is accepted during certain phases of the control of the robotic device 50.

Entity 100 receives the plurality of control commands from the control entity 70 and modifies these control commands in order to generate the modified control commands which meet a maximum or target radio resource consumption. The target cumulated goal tolerance is to keep the difference between the sent and the received velocity commands minimal while minimizing the utilized radio resources. It is possible that the order scheduler sets the goal tolerance of the trajectory execution. Each control command sent to the robotic device needs certain resources in the wireless network. Based on the network load it can be determined how many control commands can be transmitted. The control commands transmitted address a first number of degrees of freedom (DOF). Based on the network load it is determined how many DOF can be addressed at most. This number is called reduced number of DOF. Entity 100 generates modified control commands which address at most the reduced number of DOF The modified control commands address a limited number of DOF smaller or equal to the reduced number.

As will be discussed below, the entity 100 checks the available radio resources and controls only the joints using servos that fit into the available radio resources.

In the following different options to modify the received control commands as received from the robotic control entity 70 are discussed.

The original action or the planned trajectory may be analyzed in order to decide whether it can be divided into a low and a high quality of control, QoC, phase. By way of example a pick action comprises an approaching phase and a picking of the part phase. The approaching part is a low QoC action, meaning that it does not require a very precise control, whereas the picking action is a high QoC action which needs an accurate control in order to grip or pick the desired part by the robotic device. A regular robot arm may have six degrees of freedom with three degrees of freedom for the movement in the Cartesian space and three degrees of freedom for the gripper to ensure that every approach direction is possible. In the low QoC phase the first translational degrees of freedom, such as the base, shoulder and elbow, might be enough for a control. In the picking phase, however, all the degrees of freedom including the three wrist joints are controlled as well. Accordingly, the radio resource consumption is halved in the low QoC phase. The output by the system will be a worse path compared to the original path. I may be considered as an option for the cases in which accurate trajectories are not absolutely necessary. The information about a high/low QoC may come from an external party such a user of the robotic device which defines as an input in which part of the trajectory an adaptation of the command is possible and in which part of the trajectory the adaptation is not possible in view of the required exact trajectory that is needed for carrying out a required task. If enough radio resources are provided the original commands are not amended, only when not enough radio resources are provided the commands are amended. Further as indicated above, the trajectory or movement may comprises periods (segments of the trajectory) where no adaptation is allowed and may comprise periods (segments) where the adaptation is allowed.

In the following the functional controlling of the plurality of control commands is discussed in more detail. As symbolized by the arrow in FIG. 1 from the sensors 52 to the control unit 70 status messages are transmitted back to the control entity informing the control entity 70 about the current status of the movement and/or position of the robotic device and its components.

These status messages are analyzed by the trajectory modification entity 100, wherein the status message can have the form of a joint speed vector $\vec{v}_{status}$. Furthermore, the joint speed command messages sent to the robotic device denoted as $\vec{v}_{command}$ are analyzed. In the following it is assumed that the modular robots with the different joints have one-dimensional speed vectors.

The kinematics is the transformation from the joint space to a Cartesian space, denoted by the vector-vector function T:

$$\begin{bmatrix} \theta_1 \\ \theta_2 \\ \theta_3 \\ \theta_4 \\ \theta_5 \\ \theta_6 \end{bmatrix} \xRightarrow{T} \begin{bmatrix} p_x \\ p_y \\ p_z \\ \psi \\ \theta \\ \phi \end{bmatrix} \quad (1)$$

The position of the arm in the Cartesian space can be calculated from the joint positions read from the status messages as follows:

$$\vec{P}_{status} = T(\vec{\theta}_{status}) \quad (2)$$

The position of the planned trajectory point in the Cartesian space can then be calculated as follows:

$$\vec{P}_{plan} = T(\vec{\theta}_{status} + \vec{v}_{status} * \Delta t) \quad (3)$$

Δt is a predefined time period, such as 10, 50 or 100 ms.

The planned trajectory is now approximated by different approximated trajectories, wherein each of the approximated trajectories is based on a sub-combination of the number of degrees of freedom the robotic device has. This sub-combination has at most the reduced number of degrees of freedom which is determined based on the available radio resources. By way of example the result of the assessment of the radio resources may indicate that at most three degrees of freedom can be controlled. This number is then the reduced number which builds an upper threshold of the degrees of freedom on which the approximated trajectories are planned. The different approximated trajectories may be determined based on Jacobian matrices.

Accordingly, the planned trajectory can be approximated by custom-made Jacobian matrices of the robotic device having a limited number of degrees of freedom corresponding to limited joint setups. The Jacobian of the robotic device can be calculated for all combinations of the degrees of freedom of the available degrees of freedom of the robotic device. In the example of six degrees of freedom, it may be calculated for all combinations of one, two, three, four, five, six degrees of freedom.

Practically, $C(6,1)+C(6,2)+C(6,3)+C(6,4)+C(6,5)+C(6,6)=62$ shows how many different possible subsets can be made from the larger set. For this calculation, the order of the items chosen in the subset does not matter. $C(n,k)$ denotes the binomial coefficient.

If the Jacobian is stored in a symbolic representation, then removed joints can be considered with filled in columns in the Jacobians with 0.

$$\begin{bmatrix} \dot{x} \\ \dot{y} \\ \dot{z} \\ \omega_x \\ \omega_y \\ \omega_z \end{bmatrix} = J \begin{bmatrix} q_1 \\ q_2 \\ q_3 \\ q_4 \\ q_5 \\ q_6 \end{bmatrix} \quad (4)$$

$$J = \begin{bmatrix} R_{i-1}^0 \begin{bmatrix} 0 \\ 0 \\ 1 \end{bmatrix} \times (d_n^0 - d_{i-1}^0) & 0 \\ & 0 \\ & 0 \\ R_{i-1}^0 \begin{bmatrix} 0 \\ 0 \\ 1 \end{bmatrix} & 0 \\ & 0 \\ & 0 \end{bmatrix}$$

In the following two Jacobians are considered: one with base, shoulder, elbow and one with base, shoulder degrees of freedom. All those Jacobians are considered which represent the free degrees of freedom to be controlled with the available radio resources. The velocity of that Jacobian is forwarded which error is the smallest compared to the current velocity command.

$$J_{[B,S,E]}(\vec{P}_{status}, (\vec{P}_{plan}-\vec{P}_{status})/\Delta t = \vec{v}_{[B,S,E]} \quad (5)$$

$$J_{[B,S]}(\vec{P}_{status}, (\vec{P}_{plan}-\vec{P}_{status})/\Delta t = \vec{v}_{[B,S]} \quad (6)$$

The proposed solution should choose the actuation of those joints which minimizes the following formulae:

$$\min\{|\vec{v}_{[B,S,E]}, \vec{v}_{[B,S]}, \ldots \}|-|\vec{v}_{command}| \quad (7)$$

The Jacobians calculate the error in Cartesian space, thus minimizes the error to the original planned trajectory inherently. The result of this minimization is a set of commands, the modified commands which address the limited number of DOF Furthermore, it is possible that the trajectory modification entity does some temporal planning with a limited number of degrees of freedom. Entity 100 can plan ahead and can furthermore check if the approximated trajectories obtained by the Jacobians lead to singularity points. Furthermore, it is possible to consider future estimates of the available radio resources. A Dijkstra shortest path algorithm on the velocity errors can be calculated as inter alia known from the following document: J. De Maeyer, B. Moyaers and E. Demeester, "Cartesian path planning for arc welding robots: Evaluation of the descartes algorithm," 2017 22nd IEEE International Conference on Emerging Technologies and Factory Automation (ETFA), Limassol, 2017, pp. 1-8. doi: 10.1109/ETFA.2017.8247616.

Furthermore, the planning can be extended with geometric information on the capabilities of the involved components of the robotic device, by way of example a certain robot arm structure.

The reachable Cartesian coordinates may be considered if it is known that certain tasks are carried out at a certain time. The actually needed degrees of freedom may also be predicted.

By way of example the sorting out of faulty parts from a conveyor belt may require one degree of freedom. And a pick up or a place task may not require a proper orientation, or the gripper may be more universal and robust in terms of picking capabilities. Accordingly, the reduced number of degrees of freedom may be predicted which will be needed at a certain period of time. (e.g. based on an educated guess) when the trajectory and task to be carried out by the robotic device is known. In the example above it can mean that three degrees of freedom of the robot arm may be enough. This is based on the assumption that the error in the adaptation will be smaller the more DOFs are used.

The different approximated trajectories may consider certain constraints. One possible constraint is that in a low QoC phase the joint constraints are set up for the wrists with $\pm 1°$ as an example. In the high QoC phase these constraints can be released.

Figure 2:
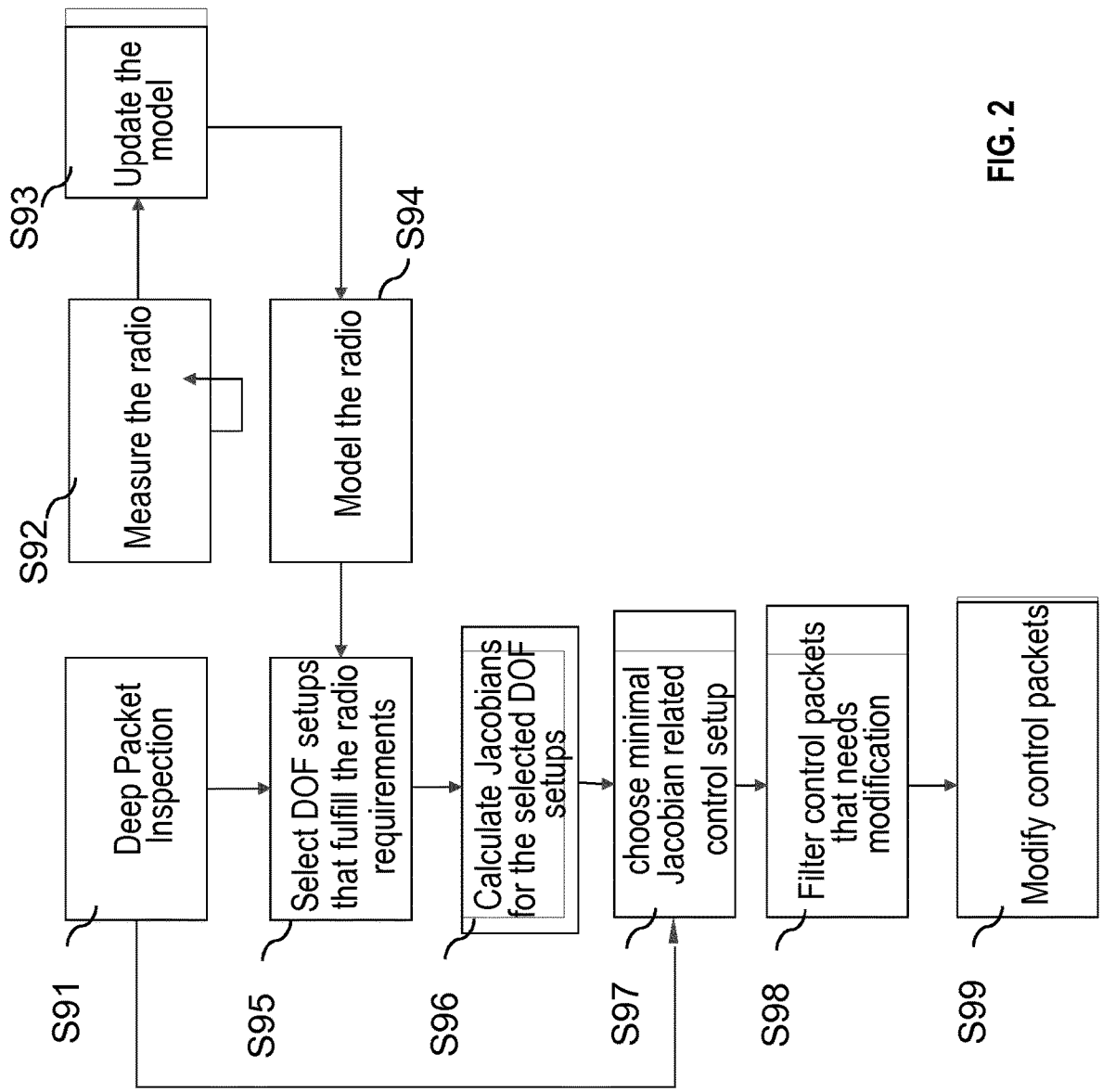
FIG. 2 shows an example flowchart of a method carried out at the trajectory modification entity to adapt the control commands based on the network load.

FIG. 2 shows one possible flowchart for carrying out the invention.

FIG. 2 shows a flowchart comprising some of the steps carried out by the system shown in FIG. 2. In step S91 a deep packet inspection may be carried out on the transmitted data packets the status messages sent from the robotic device and the control commands sent by the device 70. Furthermore, the radio load or conditions are measured continuously in step S92 and a model modeling the availability of the radio resources is updated in step S93, so that an updated model of the radio network can be generated in step S94. Here the measured radio lead is transalted into a number of joints that can be served. Predefined models may be used stored in the system which indicate, based on the radio load, how many commands or DOF/joints can be addressed. Based on information provided by the deep packet inspection and the available radio resources it can be determined in step S95 how many joints of the robot can be controlled i.e. the reduced number of DOF. By way of example if three joints and thus three servos should be controlled, the corresponding control commands for the three servos have to be generated. Based on a deep packet inspection entity 100 knows how many components or servos are addressed by the transmitted commands. The radio requirements indicate that at most the reduced number of degrees of freedom can be addressed by the different commands (e.g. 3 commands). Accordingly, in step S95 the number of degrees of freedom is determined that fulfills the radio requirements and allows a transmission of the command in the available radio resources. As shown by equation (4) above, different approximated trajectories are determined, wherein the different available combinations comprise at most the reduced set of degree of freedom (S96). As shown above by equation (7), in step S97 the Jacobian is selected which minimizes the difference between the planned and the different approximated trajectories. The control commands, i.e. the control packets that have to be modified, are identified and filtered out in step S98, and in step S99 these control packets are modified as discussed above, so that modified control commands are generated which can then be transmitted to the robotic device. The modified control commands address the limited number of DOF.

In the steps mentioned above some kind of buffering may be needed to see at least all the packets or commands for the different joints of the robotic device. Some of the control commands are filtered out, as only the limited number of degrees of freedom will be addressed with the modified control commands and the remaining degrees of freedom are modified as discussed above.

FIG. 3 summarizes some of the steps carried out by the trajectory modification entity 100 in the above discussed method. In step S110 the load of the wireless network is determined. With the knowledge of the size of the control commands it is possible to determine how many of the control commands can be transmitted in a certain timeframe over the wireless network. Furthermore, in step S111 the control commands are received from the robotic control entity 70 in which all of the degrees of freedom needed for the planned trajectory are addressed without taking into account any possible load in the wireless network e.g. the first number of DOF. Based on the determined load the reduced number of degrees of freedom is determined, wherein this number is smaller than the first number (S112). In the next step S113 modified control commands are determined based on the reduced number of degrees of freedom. The modified control commands address the limited number of degrees of freedom which is not higher, i.e. smaller or equal to the reduced number of degrees of freedom. As discussed above, the modified control commands are determined by calculating approximated trajectories and by comparing different approximated trajectories which were calculated based on different combinations of the possible degrees of freedom with the planned trajectory. In step S114 the modified control commands are then transmitted to the robotic device instead of the plurality of control commands as received from the robotic control entity.

Figure 4:
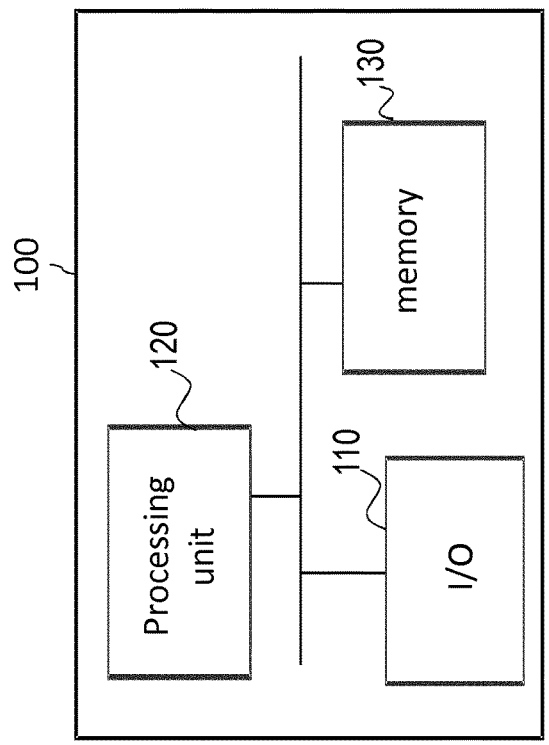
FIG. 4 shows an example schematic representation of the trajectory modification entity shown in FIG. 1.

FIG. 4 shows a schematic architectural view of the trajectory modification entity 100 configured to modify control commands for a robotic device taking into account the load of the wireless network through which these commands would have to be transmitted. The entity 100 comprises an interface or input/output 110 provided for transmitting user data or control messages to other entities. The interface 110 is especially configured to receive the control commands as generated by the robotic control entity 70. The interface is then furthermore configured to transmit the modified control commands towards the robotic device 50. The entity 100 furthermore comprises a processing unit 120 which is responsible for the operation of the entity 100. The processing 120 comprises one or more processors and can carry out instructions stored on a memory 130. The memory 130 may include a read-only memory, a random access memory, a mass storage, a hard disk or the like. The memory can include suitable program code to be executed by the processing unit 120 so as to implement the above-described functionalities.

Figure 5:
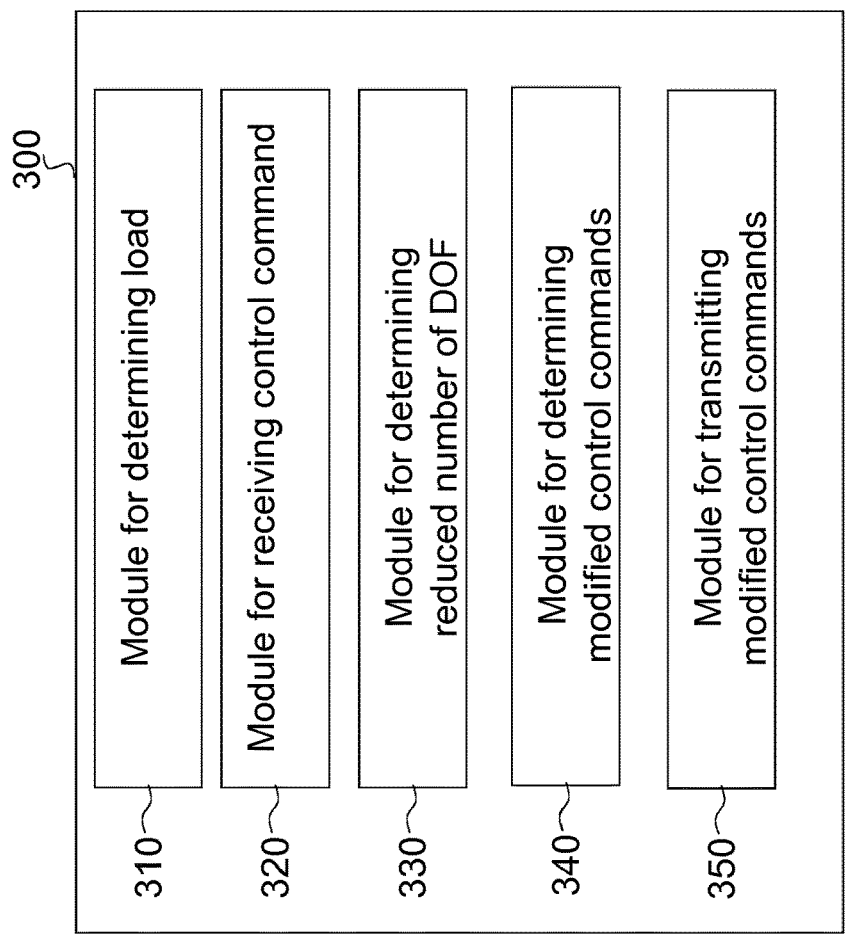
FIG. 5 shows another example schematic representation of the trajectory modification entity shown in FIG. 1.

FIG. 5 shows a further schematic architectural view of an entity 300 configured to control the robotic device with modified control commands. The entity 300 comprises a first module configured to determine the load of the wireless network. A second module 320 is provided configured to receive the plurality of control commands controlling the planned trajectory of the robotic device. A module 330 is configured to determine a reduced number of degrees of freedom smaller than the first number based on the determined load, and module 340 is configured to determine the modified control commands based on the reduced number of degrees of freedom. The modified control commands as generated by module 340 address a limited number of degrees of freedom not higher than the reduced number of degrees of freedom as determined based on the available radio resources. Module 350 is then configured to transmit the modified control commands to the robotic device which replace the received control commands.

From the above said some general conclusions can be drawn.

The modified control commands can be determined as follows:

It is possible to determine a plurality of different approximated trajectories, wherein each of the approximated trajectories is based on a sub-combination of the first number of degrees of freedom which corresponds to the number of degrees of freedom available for the robotic device. Each of these sub-combinations has at most the reduced number of degrees of freedom which was determined based on the available radio resources. Based on the received control commands a planned trajectory of the robotic device is determined taking into account this first number of degrees of freedom. The modified control commands are then determined based on a comparison of the planned trajectory to the plurality of approximated trajectories.

Furthermore, as discussed above in connection with equations (4) to (7) differences between each of the approximated trajectories and the planned trajectory can be determined and the approximated trajectory is selected which has the smallest difference to the planned trajectory. The degrees of freedom used in the approximated trajectory having the smallest difference is then selected as the limited number of degrees of freedom and the control commands resulting in the approximated trajectory having the smallest difference is then selected as the modified control commands.

The different approximated trajectories may be determined by determining the approximated trajectories for all possible combinations of the first number of degrees of freedom, wherein each combination has at most the reduced number of degrees of freedom. As it was determined that at most the reduced number of degrees of freedom can be controlled, the approximated trajectories are determined for the different degrees of freedom meeting this upper limit of the degrees of freedom that can be transmitted through the network.

Furthermore, status messages may be received from the robotic device, wherein these status messages describe the current positions of the joints of the robotic device. The planned trajectory of the robotic device can then be determined based on the received control commands and the received status messages.

For the determination of the approximated trajectories it is possible to determine the Jacobian matrices for each sub-combination of the first number of degrees of freedom. Each of these Jacobians comprises at most the reduced number of degrees of freedom.

Preferably the different trajectories and the planned trajectories are determined in a common space such as the Cartesian space. However, it should be understood that any other reference space could be used.

In the modified control commands it is possible that each control command comprises the control command for one joint of a limited number of joints from the plurality of joints, wherein the limited number of joints have the limited number of degrees of freedom which can be addressed by the control commands.

Based on the load of the network the number of degrees of freedom that can be transmitted through the wireless network is determined and corresponds to the reduced number of degrees of freedom.

Furthermore, it is possible to classify the planned trajectory into different quality classes, each quality class reflecting a precision with which the robotic device has to follow the planned trajectory, wherein the modified control commands are only transmitted instead of the received plurality of control commands or are even only generated when the quality class into which the planned trajectory has been classified has a precision lower than a defined threshold.

Deep packet inspection may be used to determine the first number of degrees of freedom.

The above-described application describes functionalities to save radio resources by limiting the level of parallelism of the controlled joints during the control of the modular robotic arms. The proposed solution has the advantage that it provides a cost-effective and effective solution in the transition from wired to wireless technologies in industrial environments. Furthermore, the existing legacy protocols and industry devices can remain unchanged. Furthermore, it can provide the same level of robot cell performance with a lower utilization of wireless resources.

The invention claimed is:

1. A method for controlling a robotic device with modified control commands transmitted over a wireless network, wherein the robotic device comprises a plurality of joints, wherein each joint represents one degree of freedom of the robotic device, the method comprising at a trajectory modification entity:
   determining a load of the wireless network,
   receiving a plurality of control commands controlling a planned trajectory of the robotic device from a robotic control entity, each of the control commands configured to control one degree of freedom of a first number of degrees of freedom addressed by the plurality of control commands,
   determining a reduced number of degrees of freedom for the modified control commands smaller than the first number based on the determined load,
   determining the modified control commands based on the reduced number of degrees of freedom, wherein the modified control commands address a limited number of degrees of freedom not higher than the reduced number of degrees of freedom,
   transmitting the modified control commands instead of the received plurality of control commands to the robotic device.

2. The method according to claim 1, wherein determining the modified control commands comprises:
   determining a plurality of different approximated trajectories of the robotic device, each approximated trajectory being based on a sub-combination of the first number of degrees of freedom, each sub-combination having at most the reduced number of degrees of freedom,
   determining, based on the received control commands, the planned trajectory of the robotic device taking into account the first number of degrees of freedom,
   determining the modified control commands based on a comparison of the planned trajectory to the plurality of approximated trajectories.

3. The method according to claim 2, wherein determining the modified control commands comprises
   determining differences between each of the different approximated trajectories and the planned trajectory,
   selecting the approximated trajectory having the smallest difference to the planned trajectory among the plurality of the approximated trajectories,
   selecting the degrees of freedom of the approximated trajectory having the smallest difference, as the limited number of degrees of freedom,
   selecting the control commands resulting in the approximated trajectory having the smallest difference as the modified control commands.

4. The method according to claim 2, wherein determining the plurality of different approximated trajectories comprises determining the approximated trajectories for all possible combinations of the first number of degrees of freedom, each combination having at most the reduced number of degrees of freedom.

5. The method according to claim 2, wherein status messages are received from the robotic device, the status messages describing current positions of the joints of the robotic device, wherein the planned trajectory of the robotic device is determined based on the received control commands and the received status messages.

6. The method according to claim 2, wherein determining the approximated trajectories comprises determining Jacobian matrices for each sub combination of the first number of degrees of freedom, each Jacobian matrix comprising at most the reduced number of degrees of freedom.

7. The method according to claim 2, wherein the different approximated trajectories and the planned trajectory are determined in a Cartesian space.

8. The method according to claim 1, wherein in the modified control commands, each control command comprises the control command for one joint of a limited number of joints from the plurality of joints, the limited number of joints having the limited number of degrees of freedom.

9. The method according to claim 1 wherein based on the load of the network the number of degrees of freedom that can be transmitted through the wireless network is determined and corresponds to the reduced number of degrees of freedom.

10. The method according to claim 1, further classifying the planned trajectory in different quality classes, each quality class reflecting a precision with which the robotic device has to follow the planned trajectory, wherein the modified control commands are only transmitted instead of the received plurality of control commands when the quality class into which the planned trajectory has been classified has a precision lower than a defined threshold.

11. A trajectory modification entity configured to control a robotic device with a modified control command transmitted over a wireless network wherein the robotic device comprises a plurality of joints, wherein each joint represents one degree of freedom of a first number of degrees of freedom of the robotic device, the trajectory modification entity comprising a memory and at least one processing unit, the memory comprising instructions executable by said at least one processing unit, wherein the trajectory modification entity is operative to:
   determine a load of the wireless network,
   receive a plurality of control commands controlling a planned trajectory of the robotic device from a robotic control entity, each of the control commands configured to control one degree of freedom of the first number of degrees of freedom,
   determine a reduced number of degrees of freedom for the modified control commands smaller than the first number based on the determined load, determine the modified control commands based on the reduced number of degrees of freedom, wherein the modified control commands address a limited number of degrees of freedom not higher than the reduced number of degrees of freedom, transmit the modified control commands instead of the received plurality of control commands to the robotic device.

12. The trajectory modification entity according to claim 11, further being operative, for determining the modified control commands, to determine a plurality of different approximated trajectories of the robotic device, each approximated trajectory being based on a sub-combination of the first number of degrees of freedom, each sub-combination having at most the reduced number of degrees of freedom, determine, based on the received control commands, the planned trajectory of the robotic device taking into account the first number of degrees of freedom, determine the modified control commands based on a comparison of the planned trajectory to the plurality of approximated trajectories.

13. The trajectory modification entity according to claim 12, further being operative, for determining the modified control commands, to determine differences between each of the different approximated trajectories and the planned trajectory, select the approximated trajectory having the smallest difference to the planned trajectory among the plurality of the approximated trajectories, select the degrees of freedom of the approximated trajectory having the smallest difference, as the limited number of degrees of freedom, select the control commands resulting in the approximated trajectory having the smallest difference as the modified control commands.

14. The trajectory modification entity according to claim 12, further being operative, for determining the plurality of different approximated trajectories, to determine the approximated trajectories for all possible combinations of the first number of degrees of freedom, each combination having at most the reduced number of degrees of freedom.

15. The trajectory modification entity according to any of claim 12, further being operative to receive status messages from the robotic device, the status messages describing current positions of the joints of the robotic device, and to determine the planned trajectory of the robotic device based on the received control commands and the received status messages.

16. The trajectory modification entity according to claim 12, further being operative, for determining the approximated trajectories, to determine Jacobian matrices for each sub combination of the first number of degrees of freedom, each Jacobian matrix comprising at most the reduced number of degrees of freedom.

17. The trajectory modification entity according claim 12, further being operative to determine the different approximated trajectories and the planned trajectory are determined in a Cartesian space.

18. The trajectory modification entity according to claim 11, further being operative to determine, based on the load of the network the number of degrees of freedom that can be transmitted through the wireless network such that it corresponds to the reduced number of degrees of freedom.

19. The trajectory modification entity according to claim 11, further being operative to classify the planned trajectory in different quality classes, each quality class reflecting a precision with which the robotic device has to follow the planned trajectory, and to only transmit the modified control commands instead of the received plurality of control commands when the quality class into which the planned trajectory has been classified has a precision lower than a defined threshold.

20. The trajectory modification entity according to claim 11, further being operative to determine the first number of degrees of freedom addressed by the plurality of control commands based on deep packet inspection carried out on the plurality of control commands.

* * * * *